United States Patent
Anger et al.

(10) Patent No.: US 6,864,444 B2
(45) Date of Patent: Mar. 8, 2005

(54) LOCKING DEVICE

(75) Inventors: Nils Anger, Berlin (DE); Matthias Biener, Neuenhagen (DE); Stefan Rautmann, Berlin (DE); Dietrich Rudolph, Berlin (DE); Jay Schwartz, Mobile, AL (US); Andreas Stelzer, Berlin (DE)

(73) Assignee: Siemens AG, Munich (DE)

( * ) Notice: Subject to any disclaimer, the term of this patent is extended or adjusted under 35 U.S.C. 154(b) by 12 days.

(21) Appl. No.: 10/277,097

(22) Filed: Oct. 22, 2002

(65) Prior Publication Data
US 2003/0141173 A1 Jul. 31, 2003

(30) Foreign Application Priority Data
Oct. 22, 2001 (DE) .......................................... 101 53 107

(51) Int. Cl.[7] .................................................. H01H 9/00
(52) U.S. Cl. ............................... 200/50.21; 200/50.01; 200/241
(58) Field of Search .......................... 200/50.21, 50.24, 200/50.25, 50.26, 50.29, 50.01, 50.03, 240, 241

(56) References Cited

U.S. PATENT DOCUMENTS

| 2,851,549 | A | * | 9/1958 | Keller et al. | ............. | 200/50.26 |
|---|---|---|---|---|---|---|
| 3,783,209 | A | * | 1/1974 | Cleaveland et al. | ..... | 200/50.25 |
| 4,713,501 | A | * | 12/1987 | Herrmann | ................ | 200/50.22 |
| 4,823,231 | A | * | 4/1989 | Jego et al. | .................. | 361/837 |
| 5,036,427 | A | | 7/1991 | Krom et al. | | |
| 5,434,369 | A | * | 7/1995 | Tempco et al. | .......... | 200/50.26 |
| 5,837,950 | A | * | 11/1998 | Horikawa | ................ | 200/50.21 |
| 6,028,272 | A | | 2/2000 | Akers | | |

FOREIGN PATENT DOCUMENTS

| DE | 1 590 206 | 11/1971 |
|---|---|---|
| DE | G 87 04 770.5 | 9/1988 |
| DE | 41 10 982 C2 | 10/1992 |
| DE | 44 20 582 C2 | 12/1995 |

OTHER PUBLICATIONS

"Schaltanlagen" by Cornelsen Girardet, c. 1999, no month.

* cited by examiner

Primary Examiner—Kyung Lee
(74) Attorney, Agent, or Firm—Morrison & Foerster LLP

(57) ABSTRACT

A locking device of an electrical switch which can be moved between a disconnected position and an operating position with the switching states of the electrical switch. A first strip has a control contour which extends in a first direction and has a ramp which interacts with a control rod which can be moved in certain states of the electrical switch.

9 Claims, 12 Drawing Sheets

LOCKING DEVICE

CLAIM FOR PRIORITY

This application claims priority to Application No. 10153107.9 which was filed in the German language on Oct. 22, 2001

TECHNICAL FIELD OF THE INVENTION

The invention relates to a locking device, and in particular, to a locking device for an electrical switch which can be moved relative to a mounting rack between a disconnected position and an operating position.

BACKGROUND OF THE INVENTION

A locking device, by way of example, for switch panels is known from Section "8.2.4 Metallgekapselte luftisolierte Schaltfelder nach DIN EN 60298 (VDE 0670, Teil 6) [Metal encapsulated, air-insulated switch panels in accordance with DIN EN 60298 (VDE 0670, Part 6]" of the "ABB-Taschenbuch Schaltanlagen [ABB Manual on Switchgear Assemblies]", 10th Edition, Cornelsen Verlag Berlin, [page 392. This describes a metal-compartmentalized switch panel, which is subdivided into a number of area elements, such as a busbar area, a cable connecting area and a switch area. An electrical switch is arranged in the switch area. This electrical switch can be moved between an operating position, a test position and a disconnected position. In the disconnected position, the connecting pieces of the electrical switch are electrically disconnected from corresponding mating contact pieces, and the secondary lines are disconnected by means of a plug connection. In the test position, the connecting pieces of the switch are disconnected from the mating contact pieces. In this position, the secondary cables of the switch and switch panel are connected to one another via the plug connection. In the operating position, the connecting pieces of the switch make contact with the mating contact pieces. The secondary cables are connected to one another by means of the plug connection. The connecting pieces of the electrical switch are in this case arranged such that, in the operating position, they project through openings, which are provided in a partition wall, into the busbar area and/or into the cable connecting area. These openings can be closed by means of shutters in order to ensure that the partition wall has a compartmentalization effect even in the case of an electrical switch which is at a remote distance or is in the disconnected or test position. The movement of the electrical switch on the mounting rack between the operating position, the test position and the disconnected position is produced by means of complex mechanical apparatuses. Appropriate assemblies engage in these complex mechanical apparatuses in order to produce a lock in certain states, in accordance with the applicable safety regulations. If an additional drive, for example for a grounding switch, is intended to be provided in the switch panel, then further locks must be provided.

SUMMARY OF THE INVENTION

The invention discloses a locking device such that a number of complex locking conditions can be satisfied with one simplified structure. Such a locking device can also be provided in order to prevent incorrect operations.

According to one embodiment of the invention, a thrust element which can be moved by fitting a tool to a drive spindle and is connected to a first strip which can be moved in a first thrust direction, with the first strip having a control contour which extends in the first thrust direction and has a ramp which interacts with a control rod which can be moved in certain states of the electrical switch.

The connection of the thrust element to the moveable first strip in itself creates the capability to prevent a tool being fitted to operate the drive spindle of a spindle drive The use of a control contour with a ramp allows the electrical switch to interact with the first strip in a simple manner via the moveable control rod. Thus, for example, the control rod can project rigidly into the control contour and block the first strip or, in the case of a control rod which can be moved if required, can also be moved along its longitudinal axis. The ramp can then be used in a particular manner to raise the control rod during movement of the first strip. However, if the control rod projects rigidly into the control contour (for example when the switch is connected), then the mobility of the first strip interacting with the control rod is restricted. The control contour of the first strip can be designed such that it has a number of ramps, for example in order to interact with a number of control rods. Furthermore, a number of ramps may be provided which alternately interact with one and the same control rod as a function of whether the switch is in the disconnected position or in the operating position. In addition to the blocking effect of the control rod by means of the control contour of the first strip, it is also possible for the first strip to act on the electrical switch by means of the control contour. It is thus possible, for example, to provide for switching of the switch to be blocked when the control rod is raised to a higher level by the ramp. Furthermore, it is possible to provide for forced disconnection of the electrical switch by a movement of the control rod by means of the control contour of the first strip, in order to ensure that the electrical switch is disconnected when it moves.

It is preferable to provide for the control contour to be formed by an outer edge of the first strip.

In on aspect of the invention, if the control contour is formed by an outer edge of the first strip, then the control contour can be introduced into the first strip with a very small amount of effort, by milling or stamping. Furthermore, this makes it possible for the control contour to act as a probe in a simple manner, for example by the action of the force of gravity on the control rod. At the same time, a control contour designed in this way limits the mobility of the control rod in one direction. The control rod can thus be lifted off the control contour, for example by further apparatuses provided for this purpose, at any point on such a control contour.

It is also preferable, in one embodiment, to provide for the first strip to have a first recess, into which a bolt which is associated with a further drive can be pushed so far that the thrust element is blocked.

In another aspect of the invention, if the first strip is used in order to fix this strip in certain switch positions by means of a bolt which is associated with a further drive, and thus to block the thrust element, then the operation of the drive spindle can be blocked in a simple manner as a function of the state of the further drive. The further drive may, for example, be a crank drive for a grounding switch, which needs to be locked with respect to the electrical switch. The bolt which is associated with the further drive may be operable, for example, by a further thrust element. In this case, it is possible to provide for the bolt to be held in its locked position or to be moved further as a function of the position of the further drive. A toggle lever drive can be provided, for example, for this purpose. This makes it effectively possible to prevent the electrical switch from being moved when the grounding switch is connected.

Another embodiment of the invention provides a locking lever, which can be pivoted by the movement of the drive spindle and bounds or does not bound the insertion depth of the bolt after it has passed through the first recess and, in interaction with the bolt which passes through the first recess without being limited, blocks any further movement of the drive spindle.

The locking lever ensures, in a simple manner, that, with the interaction with the insertion depth of the bolt which is associated with the further drive, both the capability of the electrical switch to move between the disconnected position and the operating position as a function of the position of the further drive and the capability to operate the further drive as a function of the respective movement position of the electrical switch are interlocked. The locking lever, which can pivot, is part of a mechanically robust structure.

One embodiment provides for the locking lever to be moveable by a threaded block which can be moved on the drive spindle.

The capability to move the locking lever by means of the moveable threaded block allows the first recess to be released from the locking lever in a simple manner, allowing the bolt to pass through the first recess without being limited.

Another embodiment provides that a second strip is guided such that it can be moved parallel to the first thrust direction of the first strip, with a further ramp which interacts with the moveable control rod and by means of which the control rod, which can be moved in certain states of the electrical switch, can be lifted off the control contour of the first strip.

In one aspect, the control rod can be raised to a specific level by the ramp on the first strip, and the moveable control rod can be lifted off the control contour of the first strip by the further ramp on the second strip, independently of the respective position of the moveable first strip. Lifting the control rod off the contour of the first strip makes it possible to use the control rod on the switch to force specific processes to take place, such as relieving the load on a spring energy store. Since the second strip is guided such that it can be moved parallel to the first strip, the control rod can also act on the further ramp of the second strip and can block it, for example when the control rod cannot be moved in certain states (for example when the electrical switch is in the connected state).

It is preferable, inter alia, for the control rod to be arranged such that it can be moved, if required, in a second thrust direction at right angles to the first thrust direction.

If the control rod is arranged in a second thrust direction at right angles to the first thrust direction, then this results in an advantageous spatial split and association between the individual assemblies.

Still another embodiment of the invention provides for the first strip to have a second recess into which a bolt element can be inserted in order to prevent movement of the first strip subject to the condition of at least one open door of a switch panel which accommodates the electrical switch.

In one aspect of the invention, if it is necessary to lock the movement of the electrical switch between the disconnected position and the operating position as a function of the position of a door of the switch panel, then it is advantageous to allow a further bolt likewise to act on the first strip, so that the first strip is prevented from moving, for example when the door is open. The first strip therefore allows different locks to interact in a physically simple manner.

In one aspect, it is preferable to provide for the respective insertion directions of the bolt and of the bolt element as well as the second thrust direction in each case to be arranged offset through 90° with respect to one another transversely with respect to the first thrust direction.

An arrangement such as this results in an arrangement of the individual locking conditions which is extremely economical in its use of space. This makes it possible to use the respectively available spatial conditions in an optimum manner. The individual assemblies can be arranged very close to one another.

BRIEF DESCRIPTION OF THE DRAWINGS

Exemplary embodiments of the invention will be described in more detail in the following text, and are illustrated in a drawing, in which.

DETAILED DESCRIPTION OF THE PREFERRED EMBODIMENTS

Figure 1:
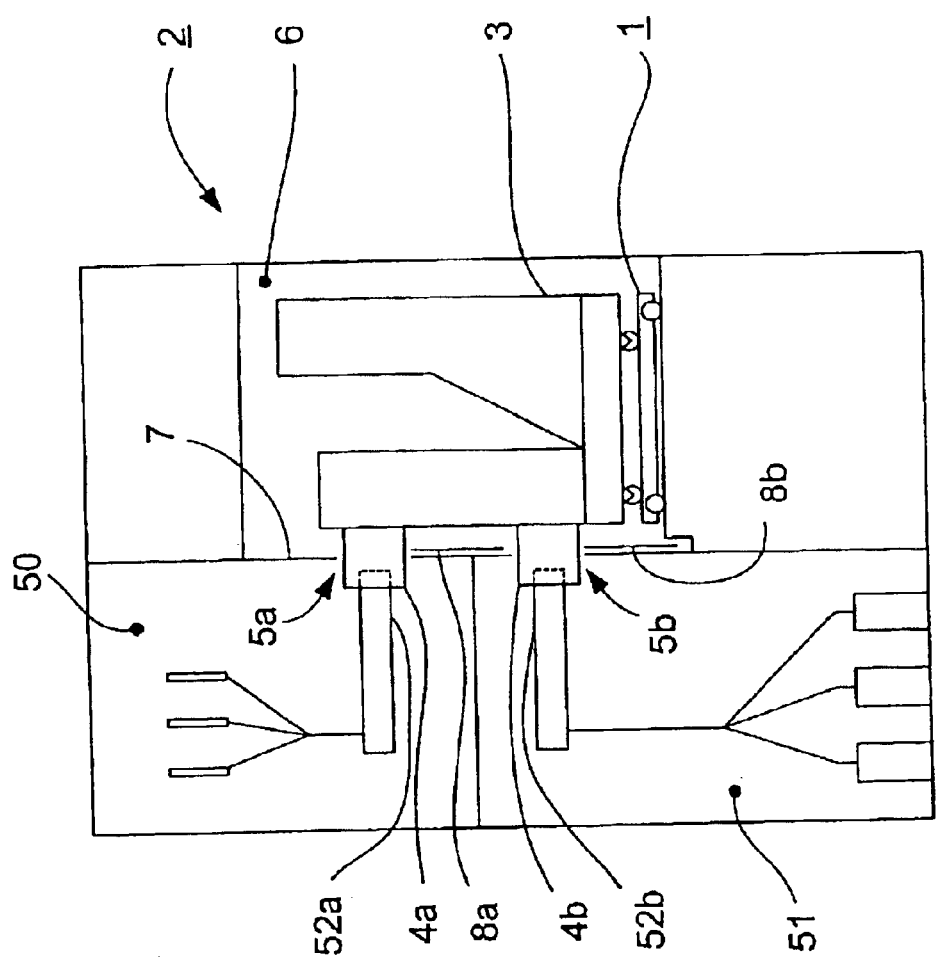
FIG. 1 shows a section through an illustrated switch panel.

The mounting rack 1, as well as the components associated with it, can be inserted into and withdrawn from a switch area 6 of an encapsulated switch panel 2 (FIG. 1). This insertion and withdrawal are required essentially for maintenance purposes and for replacement of a defective mounting rack 1 or of assemblies arranged on the mounting rack 1. An electrical switch 3 can be moved relative to the mounting rack 1, between an operating position, a test position and a disconnected position. The connecting pieces 4a,b of the electrical switch 3 can be moved through openings 5a,b in a partition wall 7 of the switch panel 2. These openings 5a,b are closed by shutters 8a,b when the electrical switch 3 is in the test position or in the disconnected position. The partition wall 7 is adjacent to the switch area 6 on one side. A busbar area 50 and a cable connecting area 51 are located on the other side of the partition wall 7. The cable connecting area 51 and the busbar area 50 each include mating contact pieces 52a,b. The connecting pieces 4a,b can make contact with the mating contact pieces 52a,b by movement of the electrical switch 3.

Figure 2:
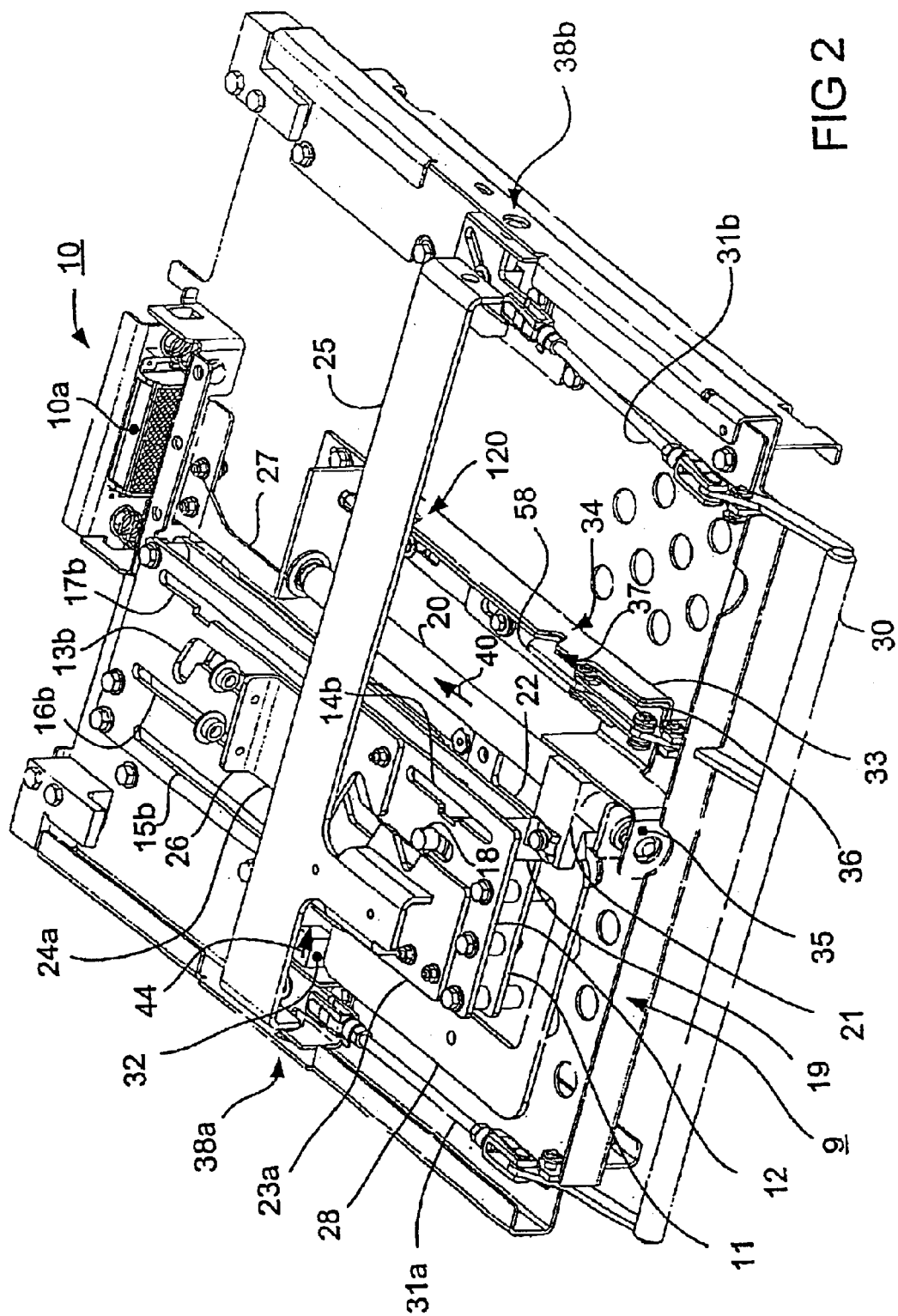
FIG. 2 shows a perspective view of the mounting rack with an integrated mechanical control module.

FIG. 2 shows a perspective view of the mounting rack 1, while the illustration does not show the electrical switch 3 associated with the mounting rack 1. The mechanical control module 9 will be described, which is intended for moving the electrical switch 3 between the operating position, test position and disconnected position, for operating the shutters 8a,b and for operating a plug connection 10 for connection of secondary cables. Secondary cables are, for example, measurement cables, control cables or communication cables.

Figure 3:
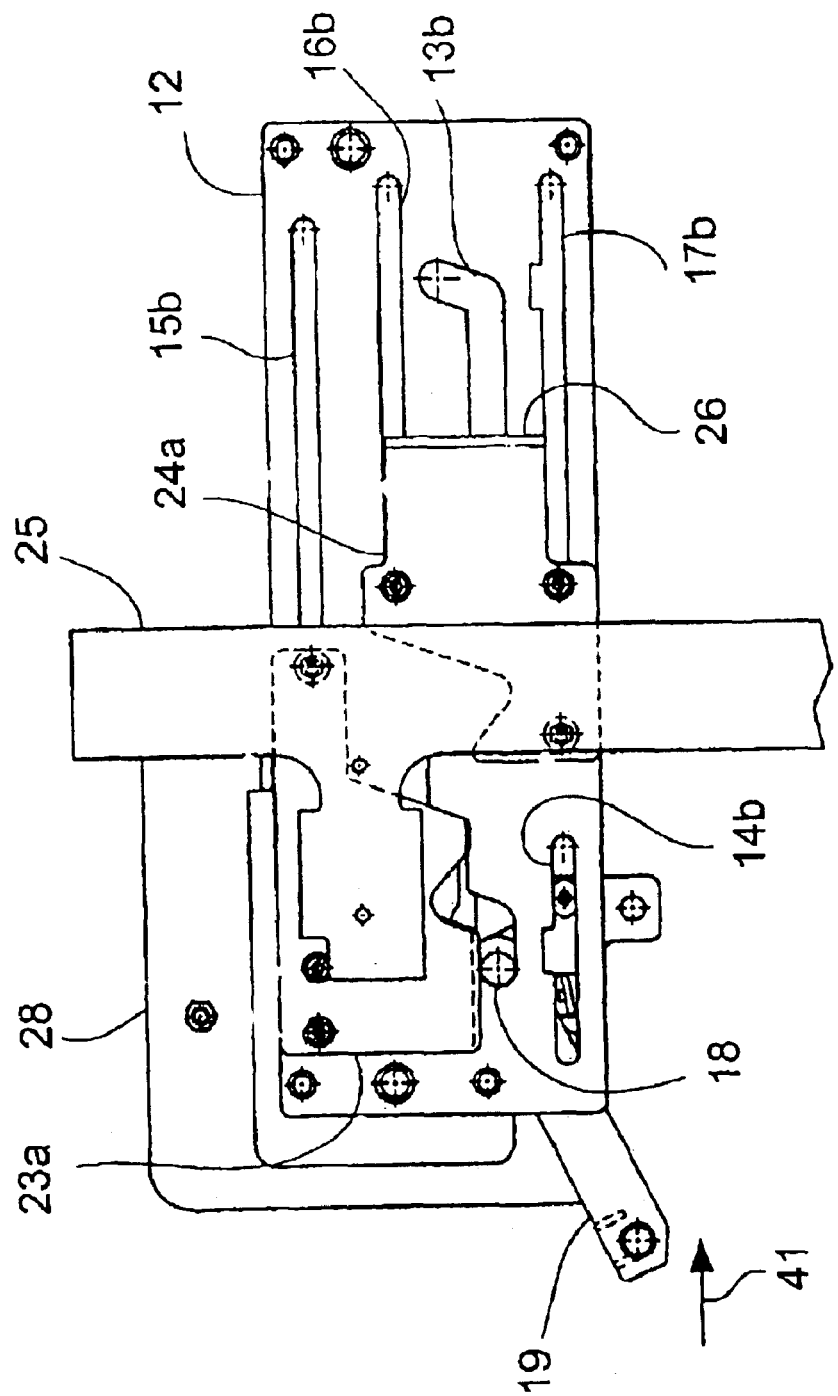
FIG. 3 shows a plan view of the first side of the control module, facing the switch.
Figure 4:
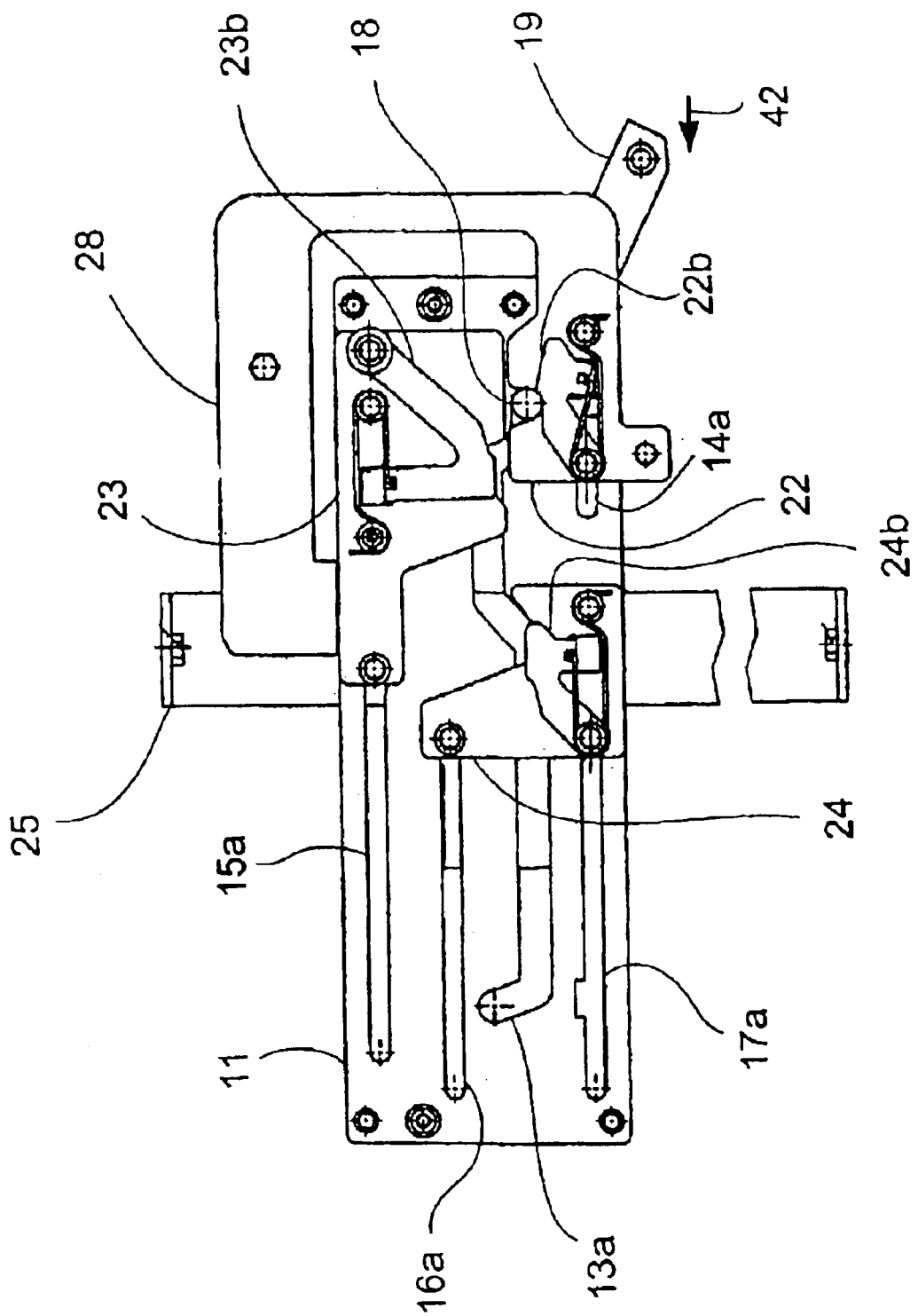
FIG. 4 shows a plan view of the second side of the control module, facing away from the switch.
Figure 5:
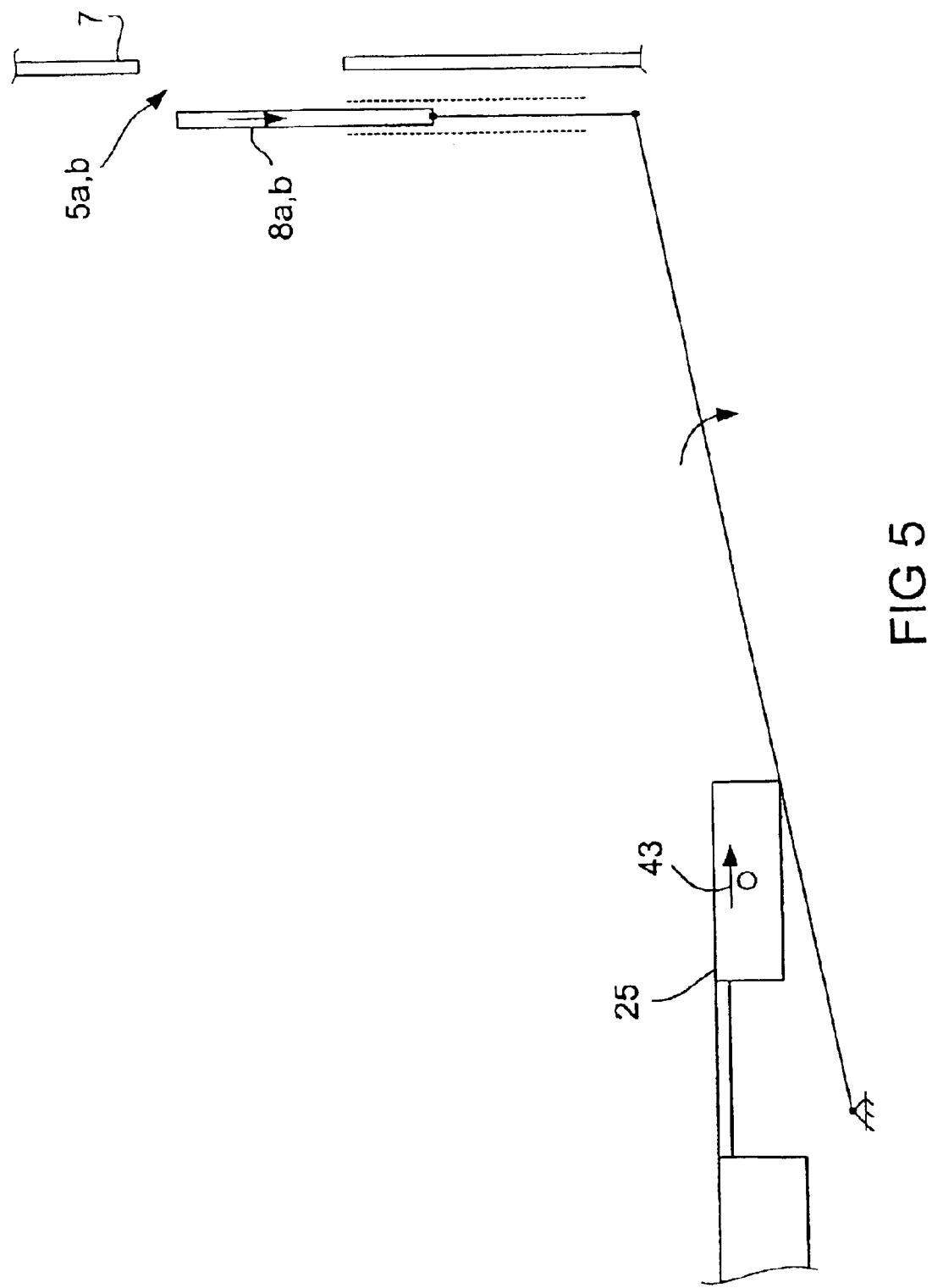
FIG. 5 shows an illustration of a lever chain for operating the shutters.

The mechanical control module 9 has a rectangular first slotted-link plate 11 and an identically shaped rectangular second slotted-link plate 12 (FIGS. 3, 4). The first slotted link plate 11 and the second slotted link plate 12 are arranged at a distance from one another. Each of the slotted link plates 11, 12 has an identical continuous first slotted link 13a,b as well as a first, a second, a third and a fourth further slotted link 14a,b, 15a,b, 16a,b, 17a,b. A bolt 18 is guided in the first slotted links 13a,b. The bolt 18 is driven by means of a drive lever 19, which is arranged between the two slotted link plates 11, 12. The drive lever 19 is in turn connected to a threaded block 21, which is arranged on a drive spindle 20 which is mounted such that it can rotate (FIG. 2). The drive spindle 20 can be rotated by means of a tool. Depending on the rotation direction of the drive spindle 20, the bolt 18 is moved in a first direction, or in a second direction which is the opposite of the first direction. A first driver apparatus 22 is arranged on the side of the mechanical control module 9 facing away from the electrical switch 3 (FIG. 4). The first driver apparatus 22 is guided by means of guide bolts such that it can move in the first further slotted link 14a in the first slotted link plate 11. A second driver apparatus 23 is mounted in a moving manner in the second further slotted links 15a,b in the first slotted link plate 11 and in the second slotted link plate 12, likewise by means of guide bolts. A third driver apparatus 24 is mounted such that it can move by means of guide bolts in the third and fourth further slotted links 16a,b, 17a,b in the first and second slotted link plates 11, 12. In order to achieve a symmetrical distribution of drive forces, the second driver apparatus 23 has a second part 23a, which is rigidly connected by means of the guide bolts and is arranged on the side of the mechanical control module 9 facing the switch (FIG. 3). Furthermore, the third driver apparatus 24 has a second part 24a, which is rigidly connected by means of guide bolts and is arranged on the side of the mechanical control module 9 facing the switch. An essentially T-shaped bracket 25, which causes the movement of the shutters 8a, 8b, is arranged at a rigid angle on the second part 23a of the second driver apparatus 23 (FIG. 2, compare with FIG. 5). A mounting lug 26 having holes is integrally formed on the second part 24a of the third driver apparatus 24, with the electrical switch 3 being mounted on this mounting lug 26, by means of which it can be moved relative to the mounting rack 1 between the operating position, the test position and the disconnected position (FIGS. 2, 3). A moveable arm 27, which moves on a plug connector part 10a, is arranged on the first driver apparatus 22. Furthermore, the first driver apparatus 22 has a locking arm 28, whose function will be described further below. In order to secure the three driver apparatuses 22, 23, 24 in the respective limit positions and to prevent unintentional movement, each of the driver apparatuses has an associated catch 22b, 23b, 24b (FIG. 4). Owing to the use of a self-locking drive spindle 20 and the design configuration of the first driver apparatus 22, there is no need for a lock for the first driver apparatus 22 when the switch 3 is in the disconnected position. Although the catches 22b, 23b, 24b are not designed to be completely physically identical, their methods of operation are, in the preferred embodiment. Each of the catches 22b, 23b, 24b is in the form of a lever which can pivot about a guide bolt. At their free ends, these levers each have a rectangular bend 22c, 23c, 24c (FIG. 6), which extends into the first slotted link plate 11 and which projects into one of the further slotted links 14b, 15b, 17b. The catches 22b, 23b, 24b are each spring-loaded, and in each case press the bends 22c, 23c, 24c against one edge of the further slotted links 14b, 15b, 17b in the unoperated state. Recesses 53, 54, 55, 56, 57 are incorporated in certain areas in the edges of the further slotted links 14b, 15b, 17b, and the bends 22c, 23c, 24c can be latched into them by virtue of the spring loading for fixing the respective driver apparatus.

The process involved in the electrical switch 3 moving from the disconnected position via the test position to the operating position will be described in the following text.

Figure 6:
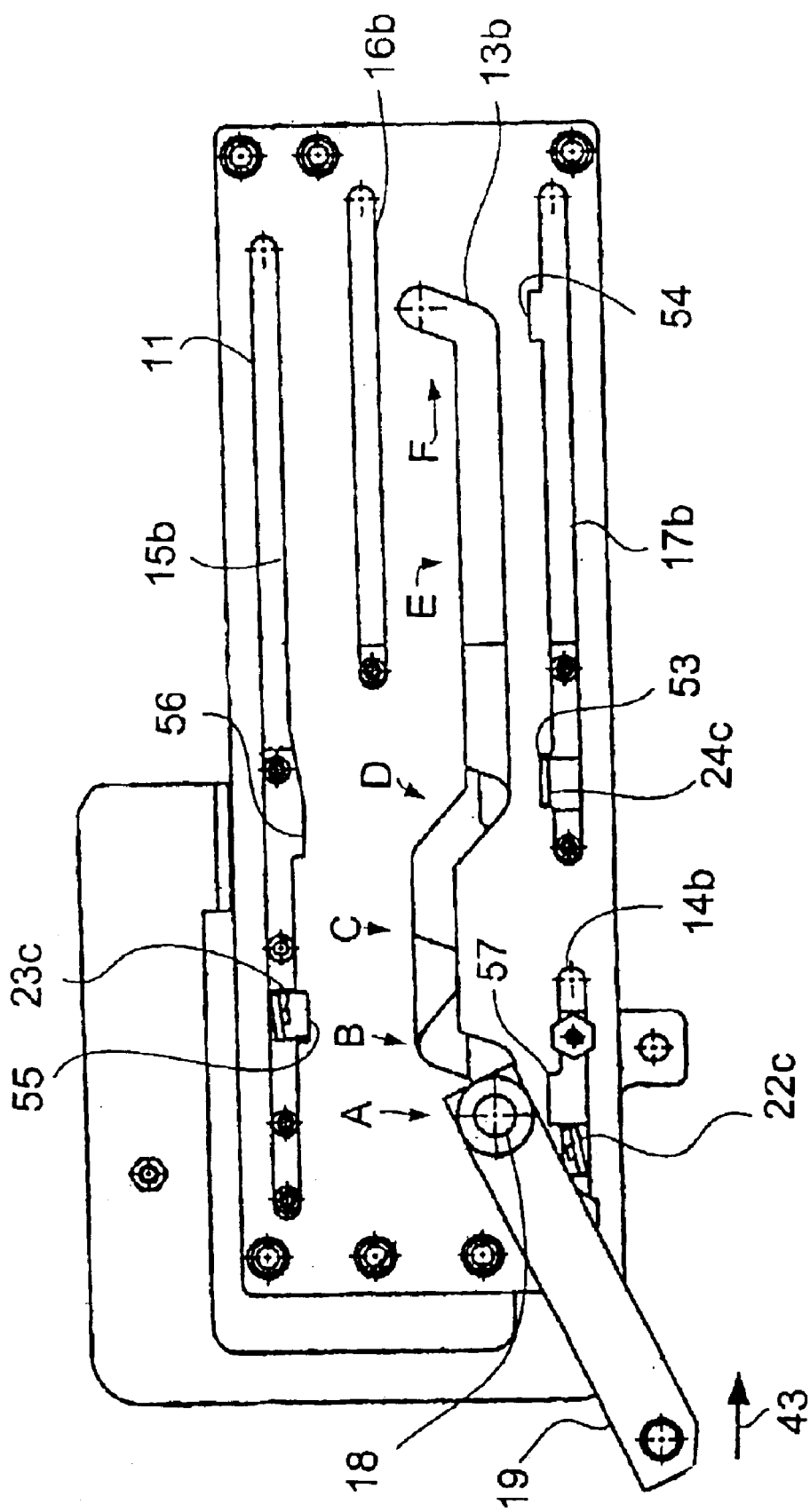
FIG. 6 shows a view of a slotted-link plate.

Initially, the electrical switch 3 is located in the disconnected position. In this position, the connecting pieces 4a,b are disconnected from the mating contact pieces 52a,b. The plug connection 10 for connection of the second cables is disconnected. The openings 5a,b in the partition wall 7 are closed by shutters 8a,b. The bolt 18 is in the position illustrated in FIGS. 3, 4 and 6 (area A, FIG. 6). If the drive spindle 20 is now rotated in a first direction, then the threaded block 21 on the drive spindle 20 starts to move in the direction which is indicated by the arrows 40, 41, 42, 43 in FIGS. 2, 3, 4, 6 and, in the process, via the drive lever 19, moves the bolt 18 along the continuous first slotted link 13a,b (FIG. 2, FIG. 6). Initially, the bolt 18 is engaged with the first driver apparatus 22, and likewise moves the first driver apparatus 22. In the process, the plug connector part 10a (which is mounted in a floating manner) is moved via the moveable arm 27 in the direction of the arrow 40 (FIG. 2), moving into the mating piece which is arranged in a corresponding manner there, but is not illustrated. Until it reaches the area B of the continuous first slotted link 13a,b, the bolt 18 is engaged with the first driver apparatus 22. On reaching the area B, the bolt 18 is disengaged from the first driver apparatus 22 and the first catch 22b can latch in the recess 57 in the first further slotted link 14b, so that the first driver apparatus 22 is fixed in its position. The electrical switch 3 is now in the test position. This means that the contact between the secondary cables is produced via the plug connection 10, although the electrical switch 3 is itself still in the disconnected position, that is the connecting pieces 4a,b of the electrical switch 3 are disconnected from the mating contact pieces 52a,b, and the shutters 8a,b in front of the openings 5a,b in the partition wall 7 are still closed. If the bolt 18 is now moved further by means of the drive spindle 20, then this unlatches the second catch 23b of the second driver apparatus 23, and moves the second driver apparatus 23 through the area C of the first slotted link 13a,b. The shutters 8a,b in front of the openings 5a,b in the partition wall 7 are now moved, releasing the opening 5a,b, via the T-shaped bracket 25 (FIG. 2) which is arranged on the part 23a of the second driver apparatus 23. This is done, for example, via a mechanical lever chain, which is illustrated schematically in FIG. 5. At the end of the section C, the bolt 18 is disengaged from the second driver apparatus 23, and the second catch 23b latches in the recess 56 in the second further slotted link 15b, so that the second driver apparatus 23 is also secured in its position at that time. In the area D, the bolt operates the third catch 24b, which is associated with the third driver apparatus 24 which it unlatches. The electrical switch 3, which is screwed to the integrally formed mounting lug 26, is then moved by means of the third driver apparatus 24, 24a along the area E relative to the mounting bracket 1 into the operating position. This means that the connecting pieces 4*a,b* of the electrical switch 3 are moved through the openings 5*a,b*, which are now free, in the partition wall 7, and make electrical contact with the mating contact pieces 52*a,b* on the other side of the partition wall 7. At the end of the movement of the electrical switch 3, the third catch 24*b* is latched in the recess 54 in the area F of the continuous first slotted link, so that this position of the third driver apparatus 24 is also secured. The bolt 18 is accordingly moved to a rest position, in order to ensure secure latching of the third catch 24*b*. In addition to the latching by the third catch 24*b*, inadvertent movement of the electrical switch 3 is prevented in the operating position by the configuration of the third driver apparatus 24 in conjunction with the self-locking drive spindle 20. The electrical switch 3 has now reached its operating position. In order to move the electrical switch 3 from its operating position to the disconnected position, the drive spindle 20 is now moved in the opposite rotation direction, and the sequence of the individual movement phases takes place in the opposite sequence.

Since the movement of the electrical switch 3 from the disconnected position via the test position to the operating position and vice versa may take place in certain boundary conditions, there are a number of locking conditions to be satisfied.

One of the locking conditions is implemented as a function of the position of a grip rod 30, which can pivot and is arranged on the front face of the mounting rack 1 (FIG. 2). When the mounting rack 1 is inserted into the switch area 6 of the switch panel 2, the grip rod 30 is arranged such that it is pivoted out. In order to withdraw the mounting rack 1 and the electrical switch 3, which is arranged on the mounting rack 1, out of the switch area 6, the grip rod 30 is pivoted upward. However, upward pivoting movement is possible when a blocking piece 32, which can be moved by a slotted-link control via a transmission rod 31*a*, can be moved from its rest position in the direction of the arrow 44. This is because this blocking piece 32 is blocked by the already mentioned locking arm 28 (which is associated with the first driver apparatus 22) as soon as the disconnected position has been left. This lock ensures that, firstly, the grip rod 30 can be pivoted up when the electrical switch 3 is in the disconnected position. Secondly, the electrical switch 3 can be moved from its disconnected position to the test position and further to the operating position when the grip rod 30 has been pivoted away to its rest position since, otherwise, the blocking piece 32 prevents the movement of the locking arm 28.

Another locking condition is provided in addition to those already described. On its front face, the drive spindle 20 has an appropriate shape so that a tool can be fitted to the drive spindle 20 in order to cause it to rotate. A thrust element 35 with a perforated panel which partially covers the drive spindle is arranged on the end face of the drive spindle 20. The thrust element 35 can be moved in the direction of the rotation axis of the drive spindle 20. This movement is produced by fitting the tool. The thrust element 35 is connected to a moveable first strip 36, which can be moved parallel to an angled profile 33. This results in a U-profiled cross section when the first strip 36 is viewed in the direction from the end. The angled profile 33, which has a recess 34 in one of its limbs, is mounted in a fixed position on the base surface of the mounting rack 1. The first strip 36 has a control contour with a ramp 37. A control rod 123 (see FIGS. 10 and 11) projects into the recess 34. This control rod 123, which extends at right angles to the base surface of the mounting rack 1, cannot be moved or its position can be moved depending on the switching state of the electrical switch 3. In another embodiment, a ramp and recess are provided on the first strip 37 and on the angled profile 33. The embodiment is illustrated in the area 120 (partially concealed by the bracket 25) in FIG. 2. This embodiment is used in order to allow the control rod 123, which is provided on the electrical switch 3 (and can be moved with it), to interact with the control contour on the first strip 36 even when the electrical switch 3 is in the operating position.

The thrust element 35 can be moved by means of the tool which can be fitted, when the control rod 123 interacts in a moveable manner with the ramp on the first strip 36. The control rod 123 may be moveable, for example, when the electrical switch 3 is disconnected. When the electrical switch 3 is in the connected state, it advantageously cannot be moved. The fitting of the tool and hence the movement of the electrical switch 3 between the operating position, test position and disconnected position thus take place when the electrical switch 3 is in a disconnected state. The control rod 123 is mounted on the moveable electrical switch 3. When the electrical switch 3 is in its disconnected position, then the control rod 123, which can be moved when required, projects into the recess 34 in the angled profile 33.

When the electrical switch 3 is in its operating position, that is when it has been moved from the disconnected position via the test position to the operating position, then the control rod 123, which can be moved, projects into the other recess in the angled profile 33, which recess is arranged in the area 120 (FIG. 2). As already described, the first strip 36 likewise has a ramp there.

The ramp on the first strip 36, which is associated with the recess 34 in the angled profile 33, and the ramp on the first strip 36, which is associated with the recess provided in the area 120 on the angled profile 33, perform with the same function Hence, the method of operation of the ramp on the first strip 36, which is associated with the recess 34 in the angled profile 33, will be described here, by way of example. When the electrical switch 3 is in the disconnected state, the control rod 123 can be moved by the control contour on the first strip 36. This means that the first strip 36 can be moved by means of the tool in the first thrust direction 121. In the process, the ramp interacts with the control rod 123 and raises it to a higher level. The raising of the control rod 123 can in turn initiate specific processes on the electrical switch 3, for example the operation of a signaling switch. If the electrical switch 3 is switched on, then the control rod 123 projects rigidly into the recess 34 in the angled profile 33. Movement of the first strip 36 by means of the thrust element 35 is now prevented by the interaction of the ramp and the control rod 123. As an alternative to this, it is also possible to provide for the control rod 123 to be mounted such that it can move when an electrical switch 3 is in the connected state and, for example, for positive disconnection of the electrical switch 3 to occur during movement of the first strip 36 and the raising of the control rod 123 that is associated with it.

A further locking condition is provided by a second strip 58, which has a further ramp. The second strip 58 can be moved parallel to the angled profile 33, as a function of the position of the grip rod 30. When the electrical switch is in the connected state, the control rod 123 projects into the recess 34 such that it cannot be moved, so that the second strip 58 cannot raise the control rod 123 upward out of the recess 34 by means of the further ramp. The grip rod 30 thus cannot be pivoted from its rest position to the operating position. The grip rod 30 can be pivoted from its rest position to the operating position when the electrical switch 3 is switched off. The control rod 123 then moves in such a way that it can be moved by a movement of the grip rod 30, and can be moved upward by means of the further ramp on the second strip 58. The raising of the control rod 123 makes it possible, for example, to force the load on a spring energy store to be relieved, in order to prevent any risk resulting from an inadvertent switching operation when an electrical switch has been withdrawn from the switch panel 2.

Furthermore, locking of the mounting rack 1 in the switch area 6 of the switch panel 2 is provided as a function of the pivoting position of the grip rod 30. When the grip rod 30 is pivoted to the operating position, latching bolts 38a,b are pulled back by means of transmission rods 31a,b. This process of pulling back the latching bolts 38a,b is carried out by means of identical slotted link controls. One of the latching bolts 38a interacts with the blocking piece 32 and thus also ensures a locking as a function of the movement position of the electrical switch 3. If the control rod 123 is moved upward out of the recess in the angled profile 33 as a result of the pivoting movement of the grip rod 30 or the fitting of the tool to the drive spindle 20, then a mechanism (which will not be described in any more detail here) on the electrical switch 3 ensures that the electrical switch 3 cannot carry out a connection process.

Figure 7:
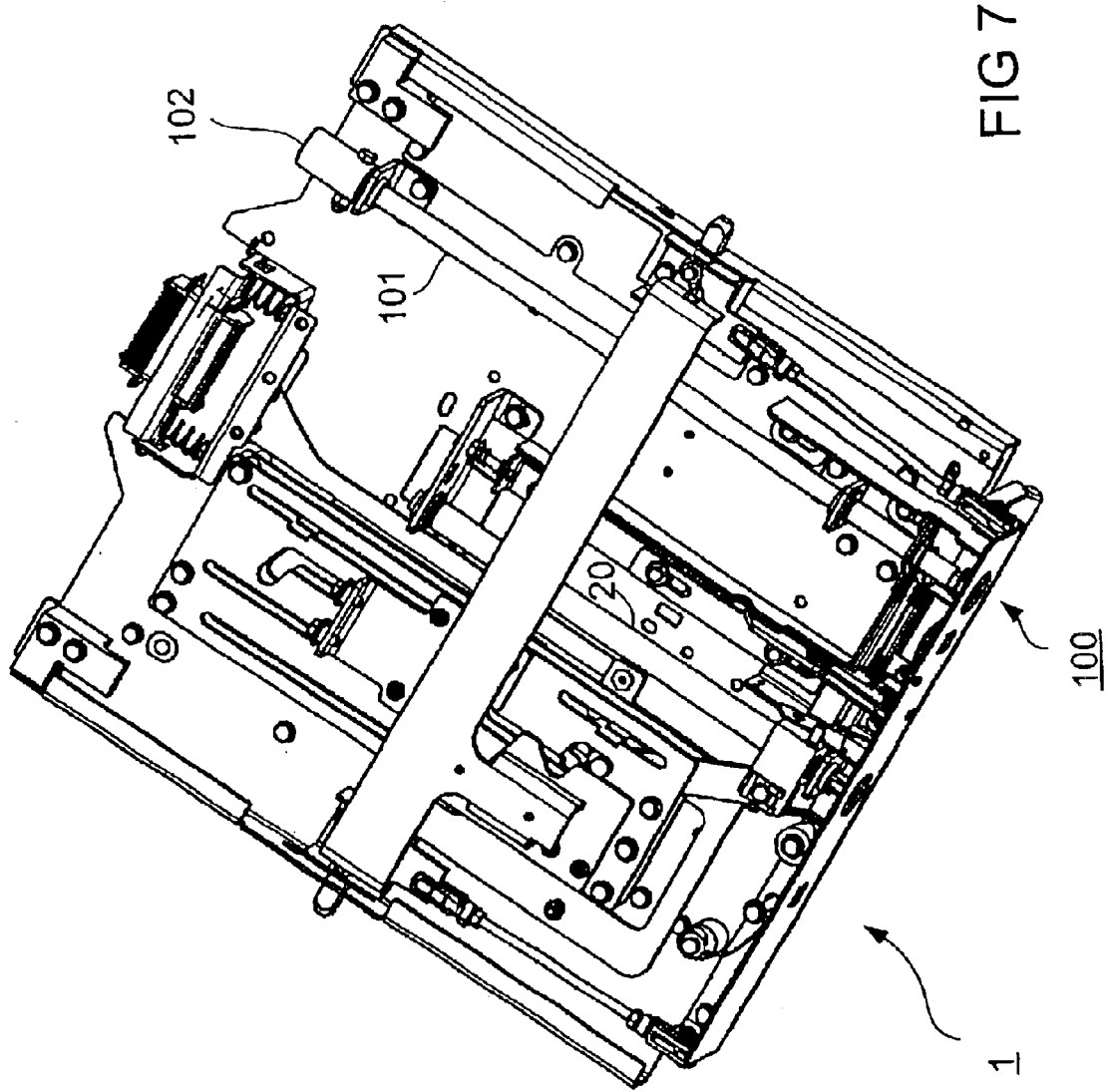
FIG. 7 shows an exemplary design of the mounting rack with a drive spindle and another drive for operating a grounding switch.

FIG. 7 shows another embodiment of the mounting rack 1 with the control module 9 and the drive spindle 20, and with another drive 100 which is arranged on the mounting rack 1. The further drive 100 is used for driving a grounding switch, which is arranged in addition to the electrical switch 3 in the switch panel 2. The further drive 100 has a shaft 101 which is essentially routed parallel to the drive spindle 20 and has a profile at one of its ends for a tool to be fitted to. A driver device 102 is provided at its other end, by means of which the drive movement of the shaft can be transmitted to the grounding switch, which is installed in a fixed position in the switch panel 2.

Figure 8:
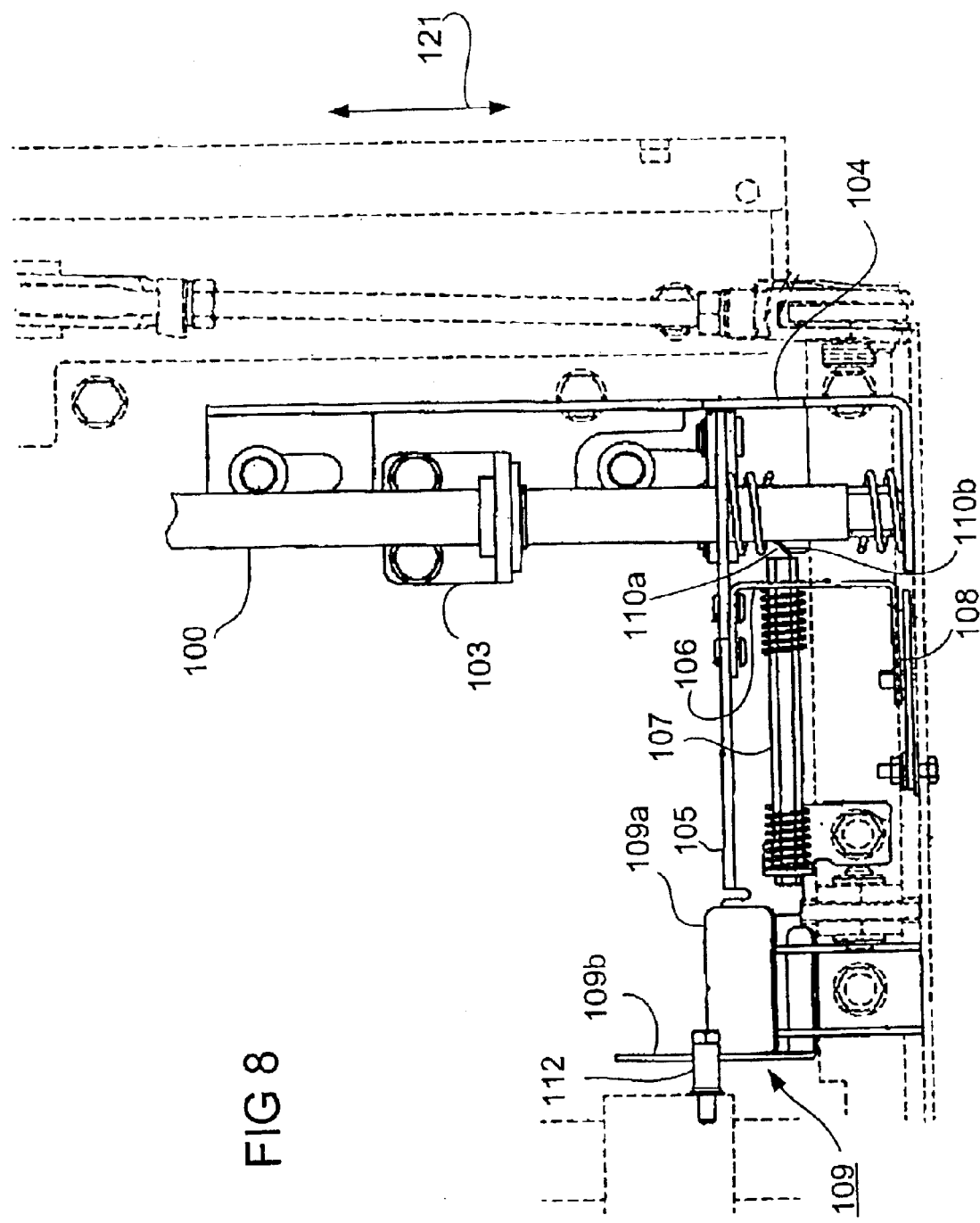
FIG. 8 shows a plan view of a part of the drive.

FIG. 8 shows a detail of the shaft 101 of the further drive. The shaft 101 is mounted in a fixed position on the mounting rack 1 by means of a mounting bracket 103. The profiling of the shaft 101 is partially concealed by an additional thrust element 104, which can be moved in the longitudinal direction of the shaft 101 when a tool is fitted. The additional thrust element 104 partially covers the shaft 101 in the form of a perforated panel in front of the operating side. Furthermore, a bolt 105 is provided, which is arranged at right angles to the thrust direction of the additional thrust element and is guided by means of a guide element 106 on a guide bolt 107 which is arranged in a fixed position on the mounting rack 1. A mechanism 108 is also arranged on the guide element 106 for the bolt 105, which indicates the switch position of the grounding switch such that it can be seen from the operating side. The bolt 105 has an associated locking lever 109, which limits the ability to move the bolt 105 as a function of the position of the threaded block 21 on the drive spindle 20. The movement of the additional thrust element 104 is transmitted to the bolt 105 by means of two thrust surfaces 110a,b which are positioned like wedges on one another and are respectively associated with the bolt 105 and the additional thrust element 104.

Figure 9:
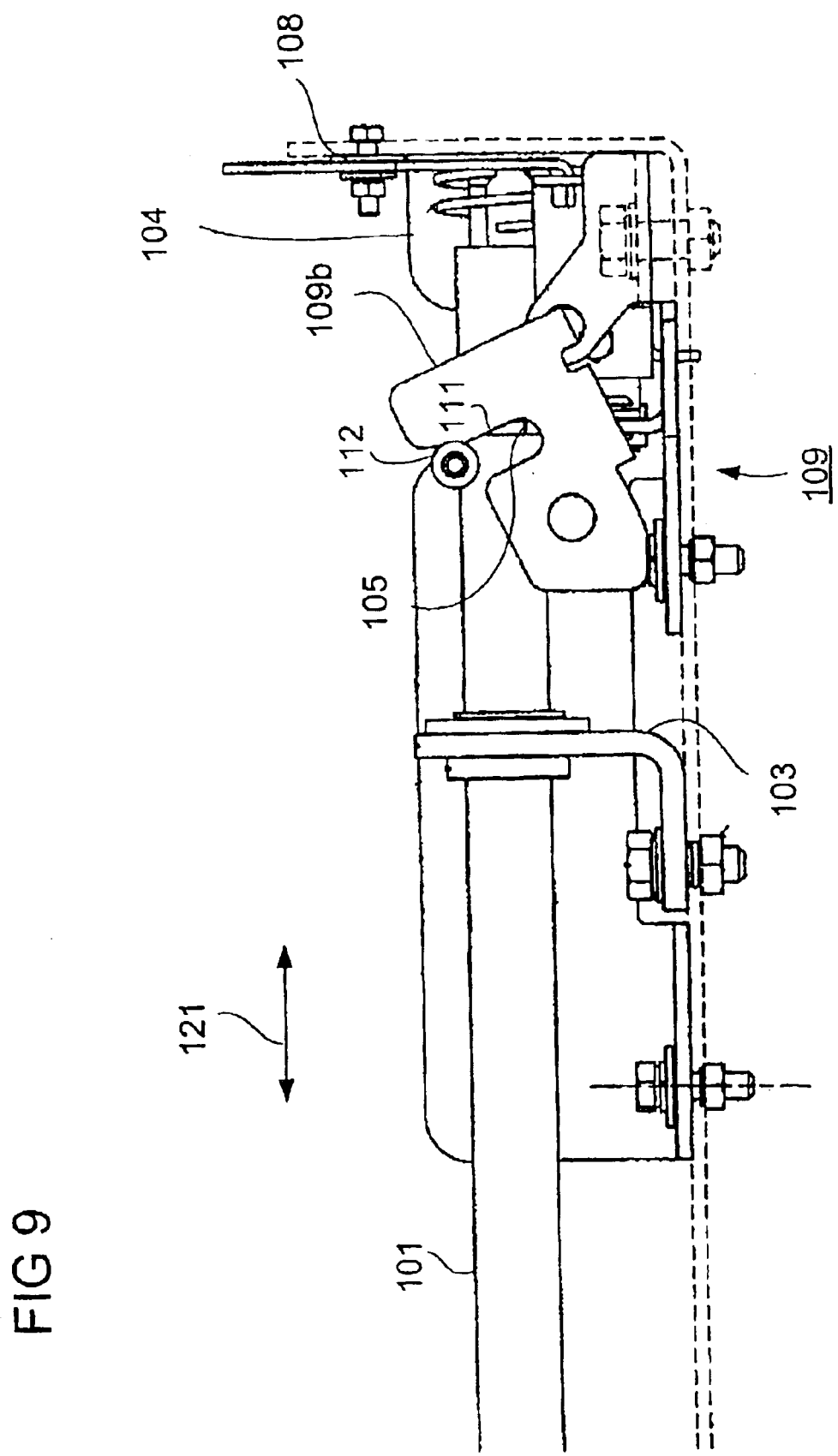
FIG. 9 shows a side view of a part of the drive.

The locking lever 109 has a locking plate 109a, which extends in the direction of the bolt 105. Furthermore, the locking lever 109 is mounted on the mounting rack 1 such that it can rotate about an axis which runs parallel to a driver bolt 112. A driver plate 109b is arranged at right angles to the locking plate 109a. This driver plate 109b of the locking lever 109 has a driver recess 111 in which the driver bolt 112 may engage, which is arranged on the moveable threaded block 21 (FIG. 9). The locking lever 109 can be pivoted by means of the driver bolt 112, depending on the position of the threaded block 21. FIG. 9 shows a side view of the locking lever 109 and of the bolt 105 with the shaft 101.

Figure 10:
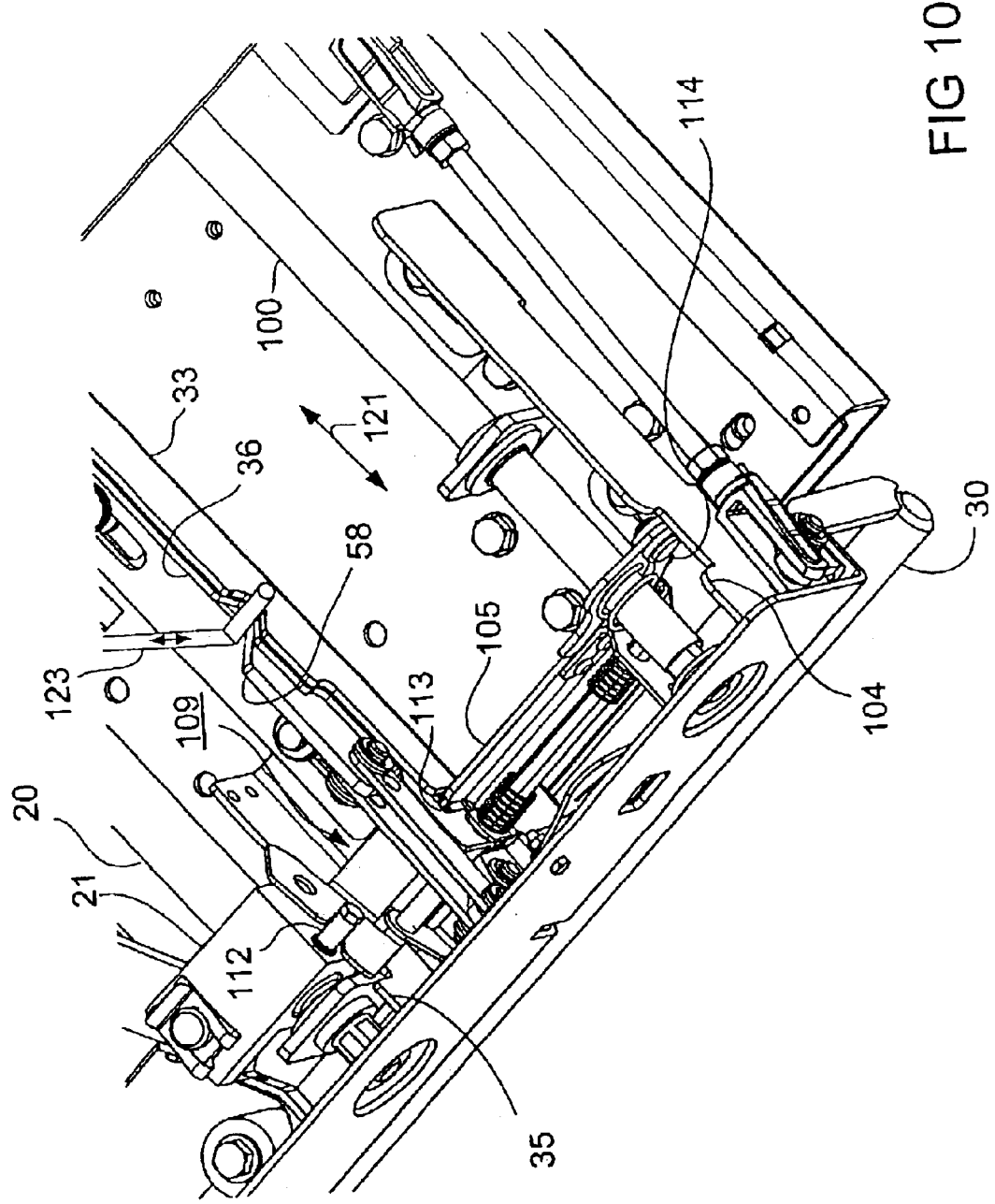
FIG. 10 shows a perspective view of a part of the drive and the drive spindle.

The perspective view which is illustrated in FIG. 10 shows the interaction of the bolt 105, of a first recess 113 in the first strip 36, of the locking lever 109 and of the threaded block 21 with the driver bolt 112 in more detail. In FIG. 10, the electrical switch 3 is in its disconnected position (which can be seen from the position of the threaded block 21 on the drive spindle 20) and the grounding switch in the switched-off state (which can be seen from the position of the bolt 105). FIG. 10 shows the first strip 36 with the control contour as well as the first recess 113, into which the bolt 105 can be moved during operation of the additional thrust element 104. In the embodiment illustrated in FIG. 10, the locking lever 109 has been raised by the driver bolt 112 of the threaded block 21, that is the locking plate 109a of the locking lever 109 has released the first recess 113 in the first strip 36. The bolt 105 can thus be moved into the first recess 113 and in the direction of the locking lever 109. This means that the grounding switch can be switched on in this situation. The bolt 105 can be moved and can be reset in a spring-loaded manner by the operation of the additional thrust element 104. When the grounding switch reaches its switched-on position, then the bolt 105 is held in its blocking position by means of a toggle lever drive 114. The electrical switch 3 can not be moved out of its disconnected position, since the locking lever 109 is blocked by the inserted bolt 105, and can no longer be lowered. If any attempt is made, the locking plate 109a strikes against the bolt 105, which is located under the locking plate 109a in the pivoting direction, and prevents further movement of the threaded block 21 on the drive spindle 20. The electrical switch 3 cannot be moved until the grounding switch has been switched off by means of the further drive 100 and the bolt 105 has moved out of the first recess 113 once again. The locking lever 109 can now be lowered by means of the driver bolt 112, and the driver bolt 112 can be moved out of the driver recess 11 in the locking lever 109 once the locking lever 109 has been lowered. An end surface of the locking plate 109a now limits the depth to which the bolt 105 can be moved in through the first recess 113. The limit to the capability to move in this way is designed such that, when the tool is fitted to the shaft 101 of the additional drive 101 and during the operation of the additional thrust element 104 which is associated with this, this can be moved to a very minor extent, and the tool cannot yet be fitted to the shaft. The first recess 113 is released again when the electrical switch 3 has been moved to its disconnected position again, and the driver bolt 112 on the threaded block 21 has hence raised the locking lever 109, so that the bolt 105 could pass through the first recess 113, without being blocked by the locking lever 109, in the course of switching on the grounding switch.

Figure 11:
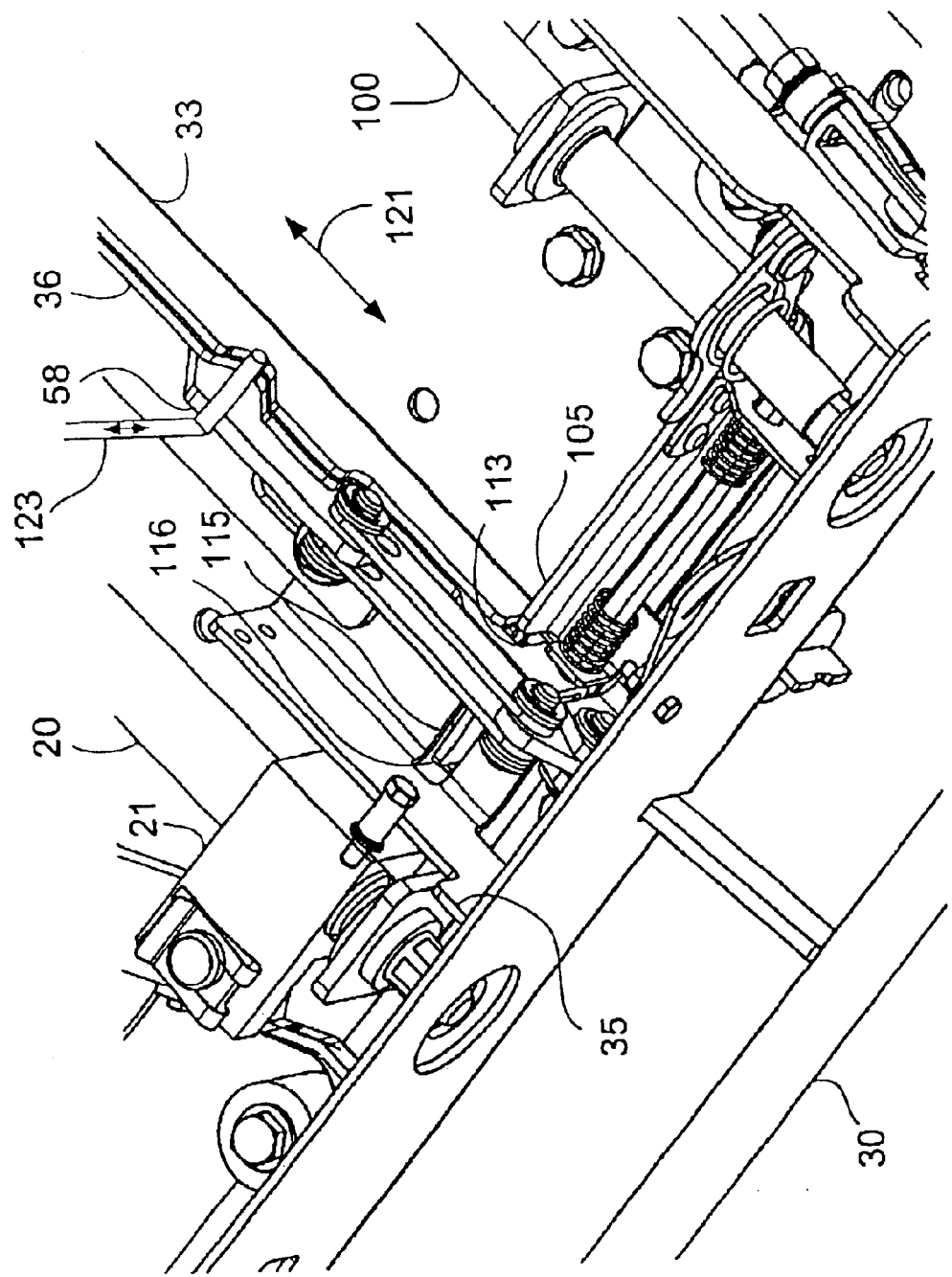
FIG. 11 shows a perspective view of a part of the drive and an exemplary embodiment of the drive spindle.

FIG. 11 shows an embodiment similar to FIG. 10. However, in contrast to FIG. 10, the locking lever 109 has been removed from the drawing illustration, in order to make it possible to see the arrangement located underneath. As in FIG. 10, FIG. 11 shows the second strip 58 with the further ramp, which can be moved in the first thrust direction (symbolized by the arrow 121) via a lever linkage, as a function of the pivoting position of the grip rod 30.

In its bottom area, the first strip 36 has a second recess 115, into which a bolt element 116 can be moved. The bolt element 116 can be moved into and out of the second recess 115 in the first strip 36 depending on two guide rails 117a,b (see FIG. 12), which can be moved independently of one another. The two guide rails 117a,b can be seen in FIG. 12. The guide rails 117a,b are arranged on an elongated bracket 118, underneath the mounting rack 1, such that they can be moved in their longitudinal direction. The guide rails 117a,b are moved by means of a door, which closes the front of the switch panel 2. Pressure elements which are fitted on the inner face of the door, for example simple iron brackets which are provided for reinforcing the door, press the guide rails 117a,b in the opposite direction to the direction of the arrow 122, independently of one another, to the position shown in FIG. 12. When the door is opened, the guide rails 17a,b are moved by spring force in the direction of the arrow 122 toward the operating side of the switch panel 2.

Figure 12:
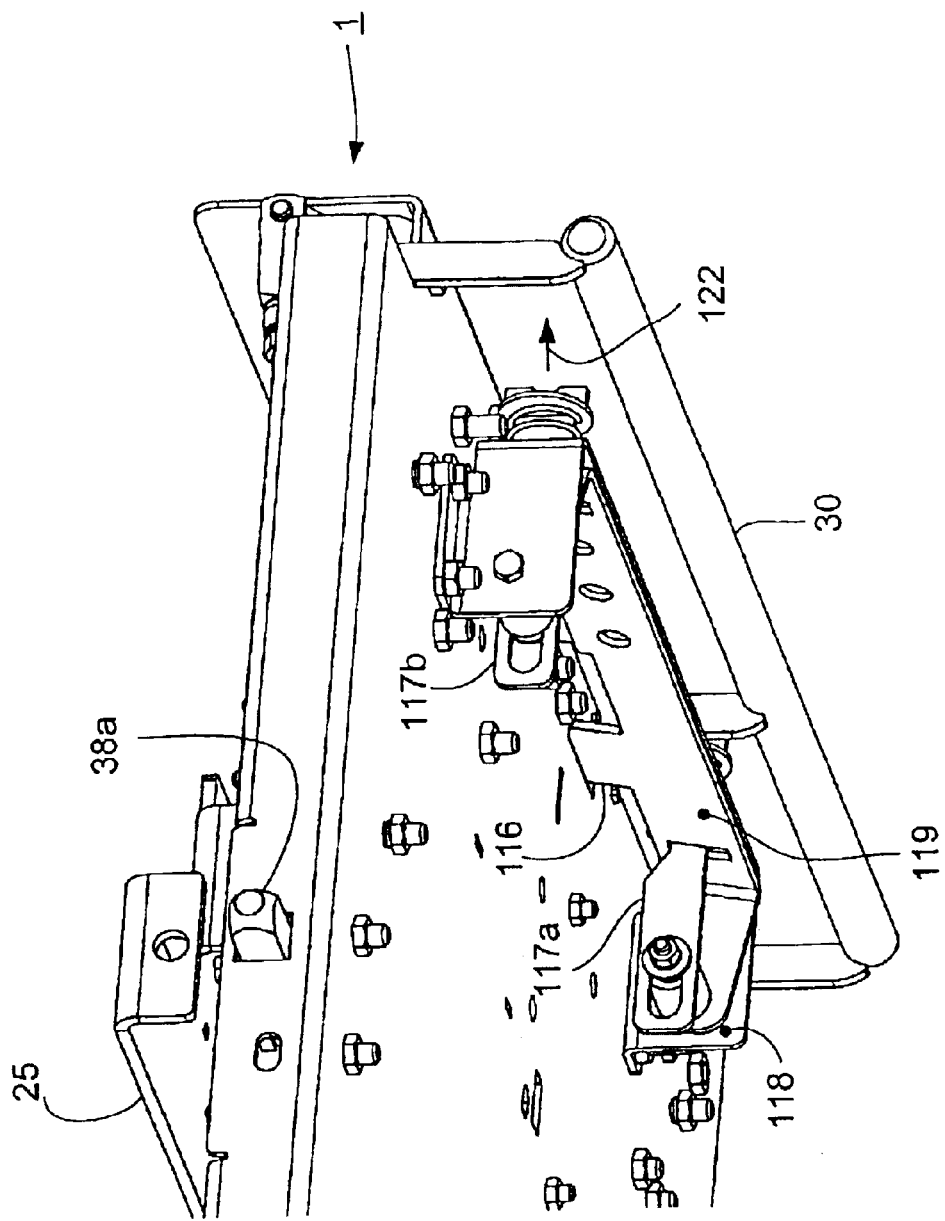
FIG. 12 shows a view of the side of the mounting rack, facing away from the electrical switch.

A lever 119 has an essentially U-shaped contour, and is supported at the ends of the free U-limbs such that it can pivot. In the bottom area of the U-contour, the lever has slots, through which the guide rails 117a,b pass. On their upper edges, the guide rails 117a,b each have an edge contour with a depression, in which the lever 119 is supported when the door is in the closed state (FIG. 12). The sizes of the depressions are in this case such that, when the door is closed, the lever 119 is recessed and the bolt element 116 passes through an opening in the mounting rack 1, but not so far that the second recess 115 in the first strip 36 would be blocked. When the door is opened, the guide rails 117a,b are moved by spring force in the direction of the front of the switch panel 2, and the U-shaped lever 119 is forced upward by the inclines on the edge contours of the guide rails 117a, b, and is moved upward in the direction of the mounting rack 1. In the process, the bolt element 116 of the lever 119 engages in the second recess 115 in the first strip 36, so that the first strip 36 is blocked. This ensures that any movement of the first strip 36 and hence operation of the drive spindle 20 are blocked as soon as a cabinet door is opened. Should a corresponding configuration now be provided for the bolt 105 which is associated with the additional drive 100, its capability to be moved in the direction of the first recess 113 by the bolt element 116 can also be limited, thus likewise blocking operation of the further drive.

What is claimed is:

1. A locking device for an electrical switch which is configured to be moved relative to a mounting rack between a disconnected position and an operating position, comprising:
    a thrust element which is configured to be moved by fitting a tool to a drive spindle and is connected to a first strip which is configured to be moved in a first thrust direction,
    the first strip having a control contour having a ramp in which, while the control rod is moved in the first thrust direction along a control rod, the control rod interacts with the ramp and is configured to move dependent on states of the electrical switch.

2. The locking device as claimed in claim 1, wherein the control contour is formed by an outer edge of the first strip.

3. The locking device as claimed in claim 1, wherein the first strip has a first recess into which a bolt, which is associated with an additional drive, is configured to be pushed such that the thrust element is blocked.

4. The locking device as claimed in claim 3, further comprising a locking lever configured to be pivoted by movement of the drive spindle and configured to bond the insertion depth of the bolt after it has passed through the first recess and, when interacting with the bolt which passes through the first recess without being limited, blocks any additional movement of the drive spindle.

5. The locking device as claimed in claim 4, wherein the locking lever is configured to be moved by a threaded block which is configured to be moved on the drive spindle.

6. The locking device as claimed in claim 1, further comprising:
    a second strip guided for movement parallel to a first thrust direction of the first strip, with an additional ramp which interacts with the moveable control rod and for which the control rod, which is configured for movement in states of the electrical switch, is configured to be lifted off the control contour of the first strip.

7. The locking device as claimed in claim 1, wherein the control rod is arranged to be moved in a second thrust direction at right angles to the first thrust direction.

8. The locking device as claimed in claim 1, wherein the first strip has a second recess into which a bolt element is inserted to prevent movement of the first strip subject to at least one open door of a switch panel which accommodates the electrical switch.

9. The locking device as claimed in claim 8, wherein a respective insertion directions of the bolt, the bolt element and the second thrust direction are in each case arranged offset through 90° with respect to one another transversely with respect to the first thrust direction.

* * * * *